US012600114B2

(12) United States Patent
Muguruma et al.

(10) Patent No.: US 12,600,114 B2
(45) Date of Patent: Apr. 14, 2026

(54) DRYING PROCESSES FOR COMPOSITE FILMS COMPRISING POLYVINYL ACETAL AND POLYVINYL ETHYLENE ACETAL RESINS

(71) Applicant: KURARAY EUROPE GMBH, Hattersheim (DE)

(72) Inventors: Shinichi Muguruma, Kurashiki (JP); Hideki Oomoto, Kurashiki (JP)

(73) Assignee: Kuraray Europe GmbH, Hattersheim (DE)

( * ) Notice: Subject to any disclaimer, the term of this patent is extended or adjusted under 35 U.S.C. 154(b) by 174 days.

(21) Appl. No.: 18/274,761

(22) PCT Filed: Sep. 24, 2021

(86) PCT No.: PCT/EP2021/076329
§ 371 (c)(1),
(2) Date: Jul. 28, 2023

(87) PCT Pub. No.: WO2022/171317
PCT Pub. Date: Aug. 18, 2022

(65) Prior Publication Data
US 2024/0367418 A1      Nov. 7, 2024

(30) Foreign Application Priority Data
Feb. 15, 2021      (EP) .................................... 21157150

(51) Int. Cl.
| | |
|---|---|
| *B32B 17/10* | (2006.01) |
| *B32B 37/24* | (2006.01) |
| *B32B 38/00* | (2006.01) |
| *B32B 38/16* | (2006.01) |

(52) U.S. Cl.
CPC .. *B32B 17/10981* (2013.01); *B32B 17/10036* (2013.01); *B32B 17/10761* (2013.01); *B32B 17/10935* (2013.01); *B32B 37/24* (2013.01); *B32B 38/164* (2013.01); *B32B 2037/243* (2013.01); *B32B 2038/168* (2013.01); *B32B 2250/03* (2013.01); *B32B 2255/10* (2013.01); *B32B 2255/26* (2013.01); *B32B 2309/02* (2013.01); *B32B 2309/04* (2013.01); *B32B 2309/14* (2013.01); *B32B 2310/0454* (2013.01); *B32B 2310/0825* (2013.01); *B32B 2329/00* (2013.01); *B32B 2605/00* (2013.01)

(58) Field of Classification Search
CPC ........ B32B 17/10981; B32B 17/10036; B32B 17/10761; B32B 17/10935; B32B 37/24; B32B 38/164; B32B 2037/243; B32B 2038/168; B32B 2250/03; B32B 2255/10; B32B 2255/26; B32B 2309/02; B32B 2309/04; B32B 2309/14; B32B 2310/0454; B32B 2310/0825; B32B 2329/00; B32B 2605/00; B32B 17/10605
See application file for complete search history.

(56) References Cited

U.S. PATENT DOCUMENTS

| | | | |
|---|---|---|---|
| 5,394,622 A * | 3/1995 | Evans | ..................... F26B 13/10 |
| | | | 34/496 |
| 2003/0130435 A1 | 7/2003 | Tanaka et al. | |
| 2003/0214715 A1* | 11/2003 | Bermel | ............. B32B 17/10761 |
| | | | 427/163.1 |
| 2003/0215582 A1 | 11/2003 | Bermel | |
| 2009/0241365 A1 | 10/2009 | Taguchi et al. | |

FOREIGN PATENT DOCUMENTS

| | | |
|---|---|---|
| CN | 105219377 A | 1/2016 |
| JP | 2005226871 A | 8/2005 |
| JP | 2012246183 A | 12/2012 |
| WO | WO-2006035756 A1 | 4/2006 |

OTHER PUBLICATIONS

Hirano Tecseed, "Dryer | Technical Expertise | Hirano Tecseed Co., Ltd.", Feb. 12, 2019, https://www.hirano-tec.co.jp/en/manufacturing/equipment_07.html (Year: 2019).*
GD&T Basics, "The Basics of Surface Finish", pp. 1-13, Jan. 6, 2021, https://www.gdandtbasics.com/basics-of-surface-finish/. (Year: 2021).*
International Search Report issued Jan. 4, 2022 in PCT/EP2021/076329, 4 pages.
Written Opinion issued Jan. 4, 2022 in PCT/EP2021/076329, 7 pages.

* cited by examiner

Primary Examiner — Christopher W Raimund
(74) Attorney, Agent, or Firm — Element IP, PLC

(57) ABSTRACT

The present invention relates to drying processes for composite films comprising a polyvinyl acetal on a carrier as well as to composite films and polyvinyl acetal films obtained in such processes.

17 Claims, No Drawings

DRYING PROCESSES FOR COMPOSITE FILMS COMPRISING POLYVINYL ACETAL AND POLYVINYL ETHYLENE ACETAL RESINS

The present invention relates to drying processes for composite films comprising a polyvinyl (ethylene) acetal on a carrier as well as to composite films and polyvinyl acetal films obtained in such processes.

Interlayer films comprising polyvinyl acetals are long known as adhesive layer for laminating glass. Especially plasticized polyvinyl butyral (PVB) films are widely used as adhesive layers for glass-glass laminates, e.g. for windshields in automotive use.

It is also known to use patches of rather thin, non-transparent plastic films in combination with the common plasticized PVB films to introduce certain functionalities into the windshield. For example, WO 2019/038043 A1 discloses thin, non-plasticized PVB films with printed obscuration areas in order to protect the sealing or the adhesive which mechanically connects the windshield with the chassis from UV radiation and to hide sensor systems from being seen from the outside of the vehicle for aesthetic reasons.

Conventionally, PVB films are produced by melt extrusion using equipment like twin screw extruders. Production of PVB films by solvent casting is also known in the art. To this end, U.S. Pat. No. 7,012,746 B2 discloses a solvent casting process for the production of PVB films on a PET carrier. The process involves drying the coated film in different zones at temperatures below 95° C. in order to avoid discoloration by thermal degradation. The level of residual solvent content is reported to be below 10% by weight, while a most preferred embodiment would be below 1% by weight.

However, the current inventors have found that even very low levels of residual solvent content can cause issues in the production of glass laminates from polyvinyl acetal films. This is especially true in the production of windshields. The automotive industry is always striving towards better optical quality of the laminates to allow the use of advanced optional sensors, e.g. for autonomous driving technologies. Without wanting to be bound by theory, it is believed that low-boiling residual solvents can cause optical flaws like bubble formation during the lamination step during which the polyvinyl acetal films need to be heated to bond the glass plies. Additionally, it is believed that residual solvents can negatively affect the adhesion between the polymer film and the glass surface.

Thus, there is a need in the industry for improved processes to produce polyvinyl acetal films, especially for use in windshields for vehicles.

Accordingly, the objective of the present invention was to provide a process for the production of a polyvinyl acetal film with improved characteristics, especially with a lower residual solvent content, lower manufacturing costs and/or higher optical quality, especially in terms of optical defects like wrinkles, bubbles or grains, less haze and/or less yellowness.

These and other problems have been solved by the present invention.

A first aspect of the present invention concerns a process for the manufacture of a composite film, said composite film comprising:

i) a film A comprising a polyvinyl acetal and/or a polyvinyl ethylene acetal and, optionally, a plasticiser, and ii) a carrier film, said process comprising the following steps, in that order:
  a) providing a carrier film;
  b) coating one surface of the carrier film with a solution comprising a solvent, the polyvinyl acetal and/or polyvinyl ethylene acetal, and the optional plasticizer;
  c1) drying the composite film on roll support at a temperature from 25 to 90° C.; and
  d) performing one or more drying steps selected from IR drying, UV drying, microwave drying, vacuum drying, roll supported drying at a temperature of more than 130° C. and less than 180° C. and air floatation drying at a temperature of more than 130° C. and less than 180° C.

Roll-Supported Drying

As used in the context of this invention, roll-supported drying is an air drying method wherein the composite film is supported by a roll and the heated air is only coming from one side of the composite film, i.e. the side opposite the roll support. Any conventional air nozzle can be used. Examples of suitable nozzle types include jet nozzles, floating nozzles, and airfoil nozzles.

Air Floatation Drying

As used in the context of this invention, air floatation drying is a method of non-contact drying wherein the composite film is kept in a floating state between flows of heated air from both sides of the composite film. Any conventional air nozzle can be used. Examples of suitable nozzle types include jet nozzles, floating nozzles, and airfoil nozzles.

Infrared Drying

As used in the context of this invention, infrared drying is a method wherein infrared rays radiated from a light source penetrate the coating film, and the absorbed energy vibrates the molecules to generate heat. Thus, the entire coating film can be heated and dried at the same time. It is characterized by a higher heating rate compared to hot air drying. Preferably, gas IR dryer or electric IR dryers are used in the present invention.

Microwave Drying

As used in the context of this invention, microwave drying is a method wherein the composite film is subjected to a microwave electric field. Heat is generated on a molecular level and the entire composite film is heated up. This is an internal heating method in which the substance itself becomes a heating element.

Vacuum Drying

As used in the context of this invention, vacuum drying is a method of drying the composite film under vacuum or reduced pressure. When the air pressure around the coating film is lowered, the boiling point of the solvent is decreasing, the evaporation rate is accelerated, and the drying of the coating film can be accelerated.

UV Drying

As used in the context of this invention, UV drying is a method wherein the heat transfer to the composite film is achieved by subjecting the composite film to UV radiation.

Preferably, at least one of the one or more drying steps of step d) is an IR drying step or an air floatation drying step at a temperature of more than 130° C. and less than 180° C.

Also preferably, at least one additional drying step c2) is performed between step c1) and step d) and wherein said additional drying step c2) is an air floatation drying step at a temperature of higher than 90° C. and less than 130° C.

It has been surprisingly found that a combination of a first roll-supported drying step at a low to medium temperature combined with at least one step at a temperature of above 130° C. leads to superior levels of residual solvent content and, especially when using air flotation drying and/or IR drying, it does not lead to noticeable yellowing of the film A.

The term "composite film" shall denote a film comprising at least two layers wherein during production, one film is deposited onto the other film. In the context of the present invention, the film A is deposited onto a carrier film by solvent casting.

The material of the carrier film can be chosen from any material with is compatible with the polyvinyl (ethylene) acetal as well as with the production method used to provide the composite films. Thus, the carrier material could be glass or metal. However, it is preferred to use a polymer material selected from the group consisting of polylactic acid, acrylonitrile-butadiene-styrene copolymer, polyamides, polycarbonates, polyethylene terephthalate (PET), polyethylene terephthalate copolymers, polyhydroxyalkanoates, polyurethanes, polyolefines such as polyethylene or polypropylenes, acrylonitrile styrene acrylate, polyacrylates and polymethacrylates, polyvinyl alcohol, TAC (cellulose tri acetate). Most preferably, the carrier contains polyethylene terephthalate (PET) and specifically, the carrier is a film consisting of PET.

Preferably, the thickness of the carrier film is from 10 to 500 μm, more preferably from 25 to 250 μm, and most preferably from 50 to 100 μm.

Film A used in accordance with the invention contains polyvinyl (ethylene) acetals, which are produced by acetalisation of polyvinyl alcohol or ethylene vinyl alcohol copolymer.

The films can contain different polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso) acetals" or "polyvinyl (n)acetals".

The polyvinylacetal used in accordance with the invention results in particular from the reaction of at least one polyvinyl alcohol with one or more aliphatic unbranched compounds containing 2 to 10 carbon atoms. To this end, n-butyraldehyde is preferably used.

The polyvinyl alcohols or ethylene vinyl alcohol copolymers used to produce the polyvinyl acetals in film A may be identical or different, pure or a mixture of polyvinyl alcohols or ethylene vinyl alcohol copolymers with different degree of polymerisation or degree of hydrolysis.

The polyvinyl acetate content of the polyvinyl acetals in film A can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes compounds.

Films A preferably contains polyvinyl acetals having a proportion of polyvinyl acetate groups, either identically or differently, of 0.1 to 20 mol %, preferably 0.5 to 3 mol %, or 5 to 8 mol %.

The polyvinyl alcohol content of the polyvinyl acetal used in film A may be between 6-26% by weight, 8-24% by weight, 10-22% by weight, 12-21% by weight, 14-20% by weight, 16-19% by weight and preferably between 16 and 21% by weight or 10-16% by weight.

In a preferred embodiment of the invention, film A comprises a polyvinyl acetal with a proportion of vinyl alcohol groups from 6 to 26% by weight and the film B comprises a polyvinyl acetal B with a proportion of vinyl alcohol groups from 14 to 26% by weight.

The vinyl alcohol content and vinyl acetate content of the polyvinyl (ethylene) acetals are determined in accordance with DIN ISO 3681 (Acetate content) and DIN ISO 53240 (PVA content).

Film A used in accordance with the invention may optionally contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate;

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate;

phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

By definition, plasticisers are organic liquids having a high boiling point. For this reason, further types of organic liquids having a boiling point above 120° C. can also be used as plasticiser.

Preferably, film A comprises less than 10% by weight, more preferably less than 5% by weight and most preferably less than 2.5% by weight of plasticizer.

In a especially preferred embodiment, film A does not contain any added plasticizer.

Preferably, the thickness of the film A is from 5 to 100 μm, more preferably from 10 to 50 μm and specifically from 20 to 40 μm.

Also preferably, film A is adhered to the carrier film with an adhesive strength of 0.05 to 10 N/3 cm, preferably 0.1-5 N/3 cm and most preferably 0.5-3 N/3 cm measured in accordance with JIS K 6854-3.

It has now been found that a certain roughness Rz of the carrier allows for the production of a film A with one very smooth surface and one surface with a certain roughness. The certain roughness of the surface of the film A can be adjusted by choosing a carrier with a complementary roughness while the other surface of the film A is very smooth owing to the production conditions of a solvent casted film.

Preferably, the surface roughness Rz of the surface of film A to be coated or printed is from 0.01 to 10 μm, preferably from 0.1 to 3.0 μm.

Also preferably, the surface roughness Rz of the carrier film on the surface in contact with film A is from 1.0 to 10 μm, preferably from 2.0 to 6.0 μm, measured before the carrier film and the film A come into contact.

If the surface of the film A is to be printed, coated or subjected to any other form of functionalisation, it is advantageous to have one smooth surface in order to provide a homogenous pattern of the print, coat or functional film. However, the opposite site of the film A, which is not being printed or coated, advantageously has a certain roughness Rz. This roughness allows for an improved de-airing during the lamination process.

The roughness Rz is measured according to DIN EN ISO 4288.

Preferably, at least one surface of film A is provided with an obscuration area, a conductive wiring for heating purposes, silver nanowires, quantum dots, an IR and/or UV reflective coating, a coating with light scattering particles, an antenna like a 5G antenna, a print with decorative elements like a company logo or a color pattern, or several elements chosen thereof.

The term "obscuration area" refers to a region of the film A having a light transmission in the visible spectrum (380 to 780 nm) of less than 10%. In a variant, the obscuration area may fade out towards transparency, e.g. in form of dotted areas or a gradient, or the obscuration area might be provided with transparent areas embedded therein, e.g. to provide a viewing area for cameras. In such variants, at least a part of the obscuration area shall have a light transmission in the visible spectrum of less than 10%.

The printed or coated layer contains an inorganic or organic pigment. As pigments, preferable carbon black, iron oxides, polyaniline, perylenes or spinel pigments are used. The pigments may be dispersed in a carrier fluid like water, alcohol or mixtures of alcohol and water.

Another aspect of the present invention concerns a composite film comprising
i) a carrier film, and
ii) a film A comprising a polyvinyl acetal and/or a polyvinyl ethylene acetal and, optionally, a plasticizer, wherein film A has a total residual solvent content of below 2000 ppm as measured according to JIS K 5601-5-1.

Preferably, the total residual solvent content is below 500 ppm as measured according to JIS K 5601-5-1.

Also preferably, the residual solvent content of each individual residual solvent is below 250 ppm as measured according to JIS K 5601-5-1.

Yet another aspect of the present invention concerns a film A1 obtained by separating the carrier film and the film A of the inventive composite film as described above wherein the film A1 comprises a polyvinyl acetal and/or a polyvinyl ethylene acetal and, optionally, a plasticizer, and wherein the film A1 has a total residual solvent content of below 2000 ppm as measured according to JIS K 5601-5-1. Thus, film A1 is the free-standing film without the carrier. It can be obtained for example by peeling off the carrier from the film A.

The term "total residual solvent content" shall denote the sum of the amounts of any residual solvent present in the composite film. Any water present in the film shall not be included in the total residual solvent content.

In terms of organic solvents for polyvinyl butyrals, suitable solvents include, for example, chlorinated solvents (methylene chloride and 1,2 dichloroethane), alcohols (methanol, ethanol, n-propanol, isopropanol, n-butanol, isobutanol, isoamyl alcohol), ketones (acetone, methylethyl ketone, methylisobutyl ketone, and cyclohexanone, diacetone alcohol), esters (methyl acetate, ethyl acetate, n-propyl acetate, isopropyl acetate, isobutyl acetate, and n-butyl acetate), aromatics (toluene and xylenes) and ethers (1,3-dioxolane and tetrahydrofuran). Polyvinyl butyral solutions may be prepared with a blend of the aforementioned solvents. To achieve a low residual solvent content in film A, preferred solvents for PVB include methylethyl ketone, ethyl acetate, methanol, and ethanol.

Still another aspect of the present invention concerns a windshield for a motor vehicle comprising the inventive film A1 as described above.

There are several ways to use the films of the present invention in the production of laminated windshields together with a standard (=plasticized) polyvinyl acetal film (called "film B" hereunder). In one simple way, the carrier film is removed and the released printed film A can be prepared for lamination by cutting to size, stacking, attaching to the surface of the standard polyvinyl acetal film B or to one of the inner glass surfaces before the final assembly of glass and interlayer for the lamination process.

Alternatively, the composite film can be processed together in steps like cutting, stacking and attaching to a surface in which the thicker, less elastic and higher melting properties of the carrier film material (such as PET) prove advantageous. Even film A with a thickness of less than 40 μm can be safely handled until the carrier film is removed shortly before or even during the assembly step. It is also possible to remove the unneeded cut portions/frame of film A from the carrier film and only leave the required portion in their final size attached to it. It is possible to position such printed "stickers" together with the larger piece of carrier film without even touching film A on the standard polyvinyl acetal film B or one of the inner glass surfaces and use the release properties of the carrier film to 1) pre-bond the printed surface of the thin film A to the surface of cut to size blanks of standard polyvinyl acetal film B by application of heat and pressure or ultrasonic welding 2) optionally stack several of such prepared combined blanks and for storage 3) remove the carrier film from the backside of the "sticker" during assembly before the lamination process starts.

The inventive composite films can be easily stored in roll form and can help to prevent sticking and transfer of surface contaminants to the back side of film A.

Plasticiser-containing films B used in accordance with the invention contain, in the starting state prior to lamination, at least 22% by weight, such as 22.0-45.0% by weight, preferably 25.0-32.0% by weight and in particular 26.0-30.0% by weight plasticiser.

In addition, films A, A1 and B may contain further additives, such as residual quantities of water, UV absorber, antioxidants, adhesion regulators, optical brighteners or fluorescent additives, stabilisers, colorants, processing aids, inorganic or organic nanoparticles, pyrogenic silicic acid and/or surface active substances.

In particular, film B may comprise 0.001 to 0.1% by weight of alkaline metal salts and/or alkaline earth salts of carboxylic acids as adhesion control agent. It is preferred that film B contains magnesium ions in an amount of at least 10 ppm, preferably 20 ppm and most preferably 30 ppm.

The lamination step for producing a laminated glass is preferably carried out such that films A or A1 and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

So called "autoclave processes" are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

Vacuum laminators may also be used. These consist of a chamber that can be heated and evacuated, in which laminated glazing can be laminated within 30-60 minutes. Reduced pressures from 0.01 to 300 mbar and temperatures from 100 to 200° C., in particular 130-160° C., have proven their worth in practice.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

The laminated glass according to invention may be used for windscreens, back-lights and side glazing for cars, busses, trucks, ships, trains or airplanes.

EXAMPLES

Preparation of the PVB Solution 1

16.0% by weight solution of polyvinyl butyral (PVB) powder (commercially available grade Mowital® B60H) dissolved in a mixture of methanol/ethyl acetate (50:50% by weight) was prepared as coating fluid "PVB solution 1".
Preparation of the Composite Film A polyethylene terephthalate (PET) film with a matt surface (grade #50-X42G commercially available from Toray Industries, Inc.) with a thickness of 50 μm was used as carrier. The surface roughness (Rz) was 4.0 μm.

A commercially available standard solvent coating apparatus including an unwinder, a coater, a dryer and a winder was used in slot die coating mode. The substrate speed was 1.1 m/min and the wet thickness of PVB solution 1 on the moving substrate was 200 μm. The coating was conducted at a temperature of 26° C. The gap between the coating lip and the moving substrate was 300 μm.

The drying was performed in three sections. The roll supported drying unit was used at the first drying zone of 1.5 m length. The temperature of first zone was set to 80° C. and the air flow was set to 5 m/s. Two air floatation drying units were used as the second and third drying zone with a length of 1.5 m each. The temperature of the second and the third zone was set to 110° C. and 140° C., respectively. In both zones, the air flow was set to 10 m/s. The total drying time in the three zones combined was 4 min.

No wrinkles and bubble defect could be identified in the composite film by visual inspection ("visual inspection 1").

The PET carrier was peeled off from a sample of the composite to measure the thickness of the dry PVB film. Measurement with a thickness gauge showed that the PVB film had a thickness of 25 μm.

The residual solvent of PVB film was 60 ppm measured by gas chromatography according to JIS K 5601-5-1.
Preparation of the Laminated Glass A stack of 20 sheets of the PVB film prepared above was made. A laminated glass of 30×30 cm was prepared using this stack between two plies of common float glass using a vacuum bag and an autoclave. The temperature of the vacuum bag was set to 100° C. The pressure of the autoclave was set to 12 bar and the temperature was set to 140° C.
Heat Storage Test

8

The laminated glass was treated at 160° C. for 16 h. No defect was found by visual inspection ("visual inspection 2").
Preparation of PVB Solutions 2 and 3

Two other coating solutions were prepared:

"PVB solution 2" was prepared from a mixture of commercially available grades Mowital® B75H and Mowital® B60H (22/75, weight by weight) as a 17.0% by weight solution in a 50/50 (by weight) mixture of methanol and methyl ethyl ketone.

"PVB solution 3" was prepared from a mixture of commercially available grades Mowital® B75H and Mowital® B30H (50/50, weight by weight) as a 13.5% by weight solution in a 50/50 (by weight) mixture of methanol and toluene.
Comparison of Drying Conditions Example 1 as described above was repeated, however, using the PVB solutions 1, 2 and 3 and different drying conditions as described in table 1.

TABLE 1

| Examples according to the invention | | | | | |
|---|---|---|---|---|---|
| Example | PVB solution | Total drying time | Drying zone 1 | Drying zone 2 | Drying zone 3 |
| 1 | 1 | 4 min | roll support 80° C. | air float 110° C. | air float 140° C. |
| 2 | 1 | 4 min | roll support 80° C. | air float 110° C. | air float 150° C. |
| 3 | 2 | 4 min | roll support 80° C. | air float 110° C. | air float 140° C. |
| 4 | 2 | 4 min | roll support 80° C. | air float 110° C. | air float 150° C. |
| 5 | 2 | 2 min | roll support 80° C. | air float 110° C. | air float 150° C. |

TABLE 2

| Comparative examples | | | | | |
|---|---|---|---|---|---|
| Comparative Example | PVB solution | Total Drying time | Drying zone 1 | Drying zone 2 | Drying zone 3 |
| 1 | 1 | 4 min | roll support 90° C. | air float 110° C. | air float 125° C. |
| 2 | 1 | 2 min | roll support 90° C. | air float 110° C. | air float 125° C. |
| 3 | 1 | 4 min | roll support 100° C. | air float 120° C. | air float 125° C. |
| 4 | 2 | 2 min | roll support 40° C. | air float 130° C. | air float 150° C. |
| 5 | 2 | 2 min | roll support 110° C. | air float 110° C. | air float 150° C. |
| 6 | 3 | 9 min | roll support 60° C. | air float 70° C. | air float 80° C. |
| 7 | 3 | 2 min | roll support 90° C. | air float 110° C. | air float 125° C. |

TABLE 3

Test results: total residual solvent content, visual inspection
of film A on carrier and laminate after heat storage

|  | Total residual solvent(ppm) | visual inspection 1 | visual inspection 2 |
|---|---|---|---|
| Example |  |  |  |
| 1 | 60 | No defect | No defect |
| 2 | 20 | No defect | No defect |
| 3 | 180 | No defect | No defect |
| 4 | 50 | No defect | No defect |
| 5 | 330 | No defect | No defect |
| Comparative Example |  |  |  |
| 1 | 570 | Bubble defect | No defect |
| 2 | 3000 | Bubble defect | Bubble defect |
| 3 | 240 | Bubble defect | No defect |
| 4 | 170 | Bubble defect | No defect |
| 5 | 260 | Bubble defect | No defect |
| 6 | 20800 | No defect | Bubble defect |
| 7 | 5800 | No defect | Bubble defect |

Alternative Drying Conditions According to the Invention

The drying in zone 2 and 3 can also be performed using heating by infrared radiation according to the invention. Using infrared heating, the total drying time can be further reduced while obtaining the same low levels of residual solvent content as described for examples 1 to 5. Thus, the following drying conditions are used:

| PVB solution | Total drying time | Drying zone 1 | Drying zone 2 | Drying zone 3 |
|---|---|---|---|---|
| 1 | 4 min | roll support 80° C. | Infrared 110° C. | Infrared 150° C. |
| 2 | 4 min | roll support 80° C. | Infrared 110° C. | Infrared 140° C. |
| 2 | 4 min | roll support 80° C. | Infrared 110° C. | Infrared 150° C. |
| 2 | 2 min | roll support 80° C. | Infrared 110° C. | Infrared 150° C. |

Alternative Drying Conditions not According to the Invention

Replacing the drying step in the first drying zone from roll support to air floatation drying, e.g. performing all three drying steps in air floatation mode, leads to comparable levels of residual solvent content as described for examples 1 to 5. However, omitting the roll support in zone 1 leads to the appearance of bubble defects.

| PVB solution | 4 min | air float 80° C. | air float 110° C. | air float 150° C. |
|---|---|---|---|---|
| 1 |  |  |  |  |

The invention claimed is:

1. A process for the manufacture of a composite film, said composite film comprising:
   i) a film A comprising a polyvinyl acetal and/or a polyvinyl ethylene acetal and, optionally, a plasticiser, and
   ii) a carrier film, said process comprising the following steps, in that order:
   a) providing a carrier film;
   b) coating one surface of the carrier film with a solution comprising a solvent, the polyvinyl acetal and/or polyvinyl ethylene acetal, and the optional plasticizer;
   c1) drying the composite film on roll support at a temperature from 25 to 90° C.; and
   d) performing one or more drying steps selected from a list consisting of the following steps: IR drying, UV drying, microwave drying, vacuum drying, roll supported drying at a temperature of more than 130° C. and less than 180° C., air floatation drying at a temperature of more than 130° C. and less than 180° C.;
   to obtain the composite film, wherein the film A has a surface roughness Rz of 0.1 µm to 3.0 µm, and wherein the carrier film has a surface roughness Rz of 1.0 µm to 10 µm on a surface in contact with the film A.

2. The process according to claim 1 wherein at least one of the one or more drying steps of step d) is an IR drying step or an air floatation drying step at a temperature of more than 130° C. and less than 180° C.

3. The process according to claim 1 wherein at least one additional drying step c2) is performed between step c1) and step d) and wherein said additional drying step c2) is an air floatation drying step at a temperature of higher than 90° C. and less than 130° C.

4. The process according to claim 1 wherein the total drying time of step c1) and step d) is from 1.0 min to 5.0 min.

5. The process according to claim 1 wherein the drying time of step d) is from 1.0 min to 1.5 min.

6. The process according to claim 1 wherein the air flow in each of step c1) and step d) is independently from 2.5 m/s to 60 m/s.

7. The process according to claim 1 wherein the air flow in step d) is from 7.5 m/s and 60 m/s.

8. The process according to claim 1 wherein the carrier film is made from a polymer selected from the group consisting of polylactic acid, acrylonitrile-butadiene-styrene copolymer, polyamide, polycarbonate, polyethylene terephthalate, polyethylene terephthalate copolymer, polyhydroxyalkanoate, polyurethane, polyolefins, acrylonitrile styrene acrylate, polyacrylates, polymethacrylate, polyvinyl alcohol, TAC (cellulose tri acetate), and mixtures thereof.

9. The process according to claim 1 wherein the carrier film has a surface roughness Rz of 2.0 µm to 6.0 µm on a surface in contact with the film A.

10. A composite film comprising
   i) a carrier film, and
   ii) a film A comprising a polyvinyl acetal and/or a polyvinyl ethylene acetal and, optionally, a plasticizer, wherein the film A has a surface roughness Rz of 0.1 µm to 3.0 µm, and wherein the carrier film has a surface roughness Rz of 1.0 µm to 10 µm on a surface in contact with the film A, and
   wherein film A has a total residual solvent content of below 2000 ppm as measured according to JIS K 5601 May 1.

11. The composite film according to claim 10 wherein the total residual solvent content is below 500 ppm as measured according to JIS K 5601 May 1.

12. The composite film according to claim 10 wherein the residual solvent content of each individual residual solvent is below 250 ppm as measured according to JIS K 5601 May 1.

13. The composite film according to claim 10 wherein the carrier film is made from a polymer selected from the group consisting of polylactic acid, acrylonitrile-butadiene-styrene copolymer, polyamide, polycarbonate, polyethylene terephthalate, polyethylene terephthalate copolymer, polyhydroxy-alkanoate, polyurethane, polyolefins, acrylonitrile styrene acrylate, polyacrylates, polymethacrylate, polyvinyl alcohol, TAC (cellulose tri acetate), and mixtures thereof.

14. The composite film according to claim 10 wherein the carrier film has a surface roughness Rz of 2.0 μm to 6.0 μm on a surface in contact with the film A.

15. A film A1 obtained by separating the carrier film and the film A of the composite film according to claim 9, wherein the film A1 comprises a polyvinyl acetal and/or a polyvinyl ethylene acetal and, optionally, a plasticizer, and wherein the film A1 has a total residual solvent content of below 2000 ppm as measured according to JIS K 5601 May 1.

16. An interlayer for a laminate comprising at least two plies of glass and the film A1 according to claim 13.

17. A windshield for a motor vehicle comprising the laminate according to claim 16.

\* \* \* \* \*